UNITED STATES PATENT OFFICE.

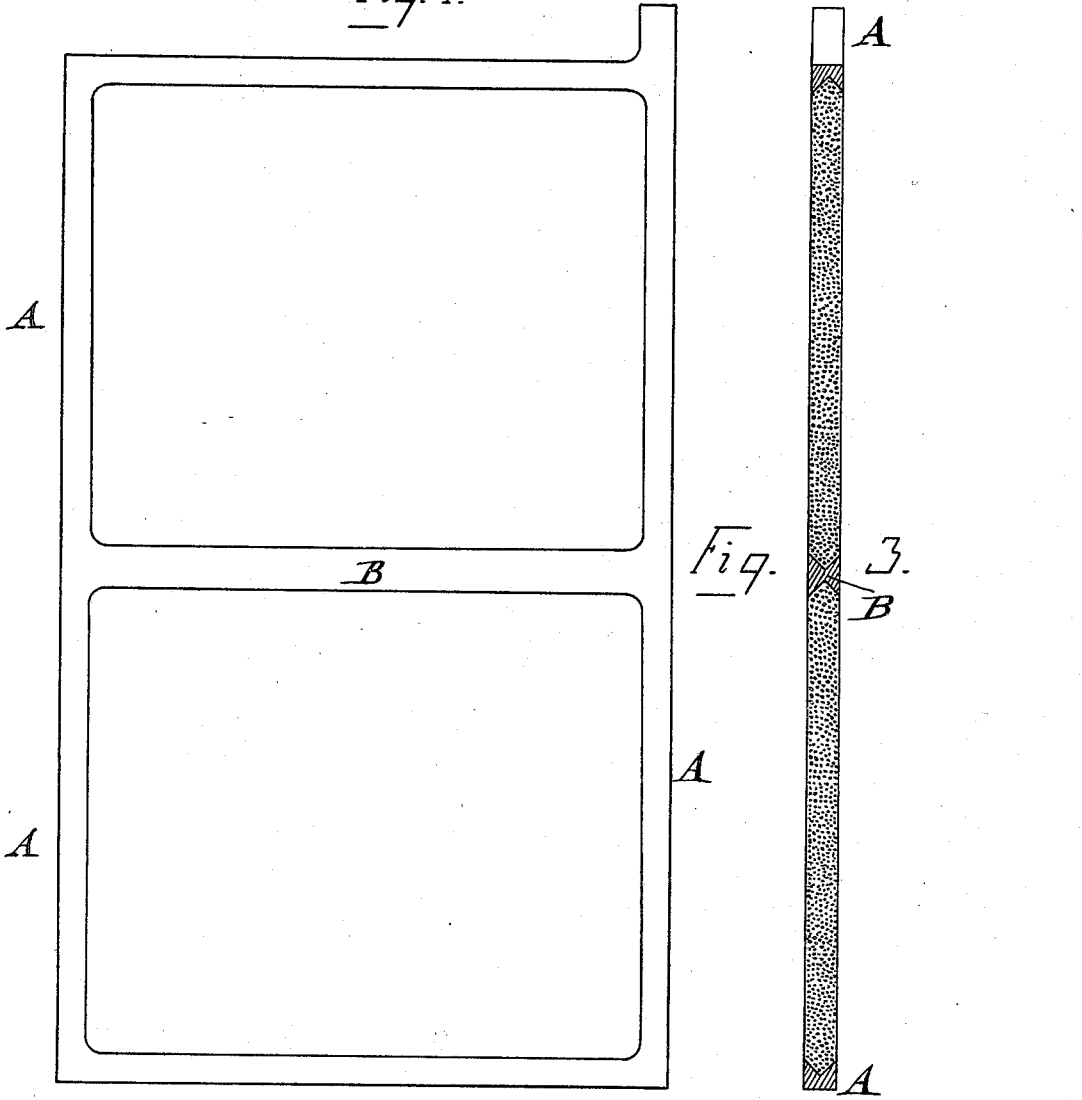

CARL MARSCHNER, OF BERLIN, GERMANY.

PLATE FOR SECONDARY GALVANIC BATTERIES AND COMPOSITION FOR PRODUCING SAME.

SPECIFICATION forming part of Letters Patent No. 608,614, dated August 9, 1898.

Application filed September 30, 1896. Serial No. 607,488. (No model.)

*To all whom it may concern:*

Be it known that I, CARL MARSCHNER, a subject of the King of Prussia, Emperor of Germany, residing at Berlin, in the Kingdom of Prussia and German Empire, have invented certain new and useful Improvements in Plates for Secondary Galvanic Batteries and a Composition for Producing the Same, of which the following is a specification.

This invention relates to a composition for filling the plates of secondary batteries in which a new binding medium is employed for the active material or body of the plate, so that the lead grids usually employed can be dispensed with and replaced by a single exterior lead frame.

Experiments were heretofore made for producing secondary-battery plates without grids, which plates were known as so-called "compressed" plates, and in which for obtaining the required strength suitable binding media were employed—such as the residue of the distillation of tar, gums, caoutchouc, &c.—but without success, inasmuch as the binding media soon became deteriorated under the influence of the electric current and were changed into a loose non-adhesive mass. Furthermore, the use of gums impairs the conductivity of the mass and renders it more difficult to bring it into the required shape.

This invention has reference to plates for secondary batteries in which the active material is mixed with a binding medium, such as amber or other fossil gum; and the invention consists, therefore, of a plate for secondary batteries comprising an exterior lead frame and a filling composed of an active material, such as lead oxid, and a binding medium, such as amber.

The invention consists, further, of a filling for secondary batteries composed of an active material and a binding medium of amber or other fossil gum, such as gedanite, glessitbeckerit, and simentit.

Referring to the drawings, Figure 1 is a view in elevation of my improved plate, showing a preferred form of frame therefor. Fig. 2 is a central vertical section, and Fig. 3 is a cross-section thereof.

Similar letters of reference indicate corresponding parts.

In preparing the composition the amber or other fossil gum is first dissolved in alcohol or in a solution of alcohol and spirits of turpentine or in any other suitable solvent. The lead oxid or other active material is mixed with a suitable quantity of this solution and is slightly heated until a plastic mass is obtained, which can be readily transferred into the exterior lead frame A, which is constructed, preferably, with a transverse connecting-brace at its center, as shown in Fig. 1. This mass possesses such effective binding qualities that it is not necessary to have recourse to pressure to hold it firmly in the frame. All that the mass requires after having been transferred to the frame is simply a flattening or smoothing of its surfaces. The plates thus obtained are then subsequently dried at a medium temperature and then acidulated by being placed for a few days in a bath of diluted sulfuric acid and then brought into proper shape.

My improved plate, made of the composition described, has the following advantages as compared with plates provided with grids:

First. They are much lighter than the plates in which the mass is inserted into the recesses or cells of the grids.

Second. They possess the advantage of having considerable strength and a certain elasticity, so that they are able to resist the shocks and concussions, whereby they are especially adapted for use for street-railway and other cars.

Third. They can be manufactured at a much smaller price than the plates heretofore used and possess a considerable storage capacity for the current, so that they can be supplied for a greater length of time.

I am aware that rosin and other gums have been proposed heretofore as a binding medium for the active material in secondary batteries, and I do not desire to claim this feature broadly. On the contrary, I desire to confine myself to the use of fossil gums, as in the same a number of substances are contained which are not present in the natural vegetable gums, as these substances act chemically on the lead oxid and form combinations with the same which render the mass firmer and which, furthermore, make it better adapted for the action of electric current. The ordinary vegetable gums form a mechanical binding medium which during the charging of the plates is decomposed by the electric current, so that its presence in the plates exerts a deleterious influence on the same. The addition of a solution of amber or other fossil gum exerts not only a mechanical, but also a chemical, influence on the plates, for the reason that these gums contain such chemical substances as, for instance, amber-acid, resinous acids (alpha, beta, and gamma gums) which are present besides amber-oil, and amber-colophony. These substances form combinations with the lead oxid which render the plates harder and capable of greater resistance to the electric current. Notwithstanding that the mass obtains by this combination a considerable firmness, it does not become brittle, which advantage is mainly due to the influence of the amber-oil contained in the amber.

Having thus described my invention, I claim as new and desire to secure by Letters Patent—

1. A plate for secondary batteries, composed of an exterior perforated containing-frame of lead, and a filling of an active material such as lead oxid, and a binding medium composed of a solution of a fossil gum, substantially as set forth.

2. A filling composition for the plates of secondary batteries, consisting of an active material such as lead oxid, and a binding medium composed of a solution of a fossil gum, substantially as set forth.

3. A filling composition for the plates of secondary batteries, composed of an active material such as lead oxid, and a binding medium composed of a solution of amber incorporated therewith, substantially as set forth.

In witness whereof I have hereunto set my hand in presence of two witnesses.

CARL MARSCHNER.

Witnesses:
W. HAUPT,
CHAS. H. DAY.